US005257331A

United States Patent [19]

Shapir

[11] Patent Number: 5,257,331

[45] Date of Patent: Oct. 26, 1993

[54] JUNCTION BETWEEN A RECTANGULAR AND A CIRCULAR WAVEGUIDE

[75] Inventor: Itzhak Shapir, Haifa, Israel

[73] Assignee: State of Isreal, Ministry of Defence, Rafael Armament, Tel-Aviv, Israel

[21] Appl. No.: 914,711

[22] Filed: Jul. 15, 1992

[30] Foreign Application Priority Data

Jul. 18, 1991 [IL] Israel ........................................ 98879

[51] Int. Cl.[5] ................................................ G02B 6/26

[52] U.S. Cl. ........................................ 385/25; 385/50; 385/146

[58] Field of Search ................... 385/50, 25, 146, 147, 385/900, 901

[56] References Cited

U.S. PATENT DOCUMENTS 4,730,883 3/1988 Mori ...................................... 385/25
4,740,048 4/1988 Mori ...................................... 385/25
5,039,192 8/1991 Basu ...................................... 385/50
5,093,890 3/1992 Bregman et al. ..................... 385/146
5,170,455 12/1992 Goossen et al. .................... 385/146

FOREIGN PATENT DOCUMENTS 592224 9/1947 United Kingdom .
645508 11/1950 United Kingdom .
761790 11/1956 United Kingdom .
773699 5/1957 United Kingdom .

*Primary Examiner*—Frank Gonzalez
*Attorney, Agent, or Firm*—Fitch, Even, Tabin & Flannery

[57] ABSTRACT

A junction between a rectangular waveguide and a circular waveguide is provided, both operating in TE transmission modes. The rectangular waveguide has broad sides A and narrow sides B, one of sides A having at its middle line a circular opening being of a diameter which is equal to or less than the diameter of the circular waveguide and the other of sides A being fitted with a tapered member inside the rectangular waveguide opposite said circular opening, an end of said circular waveguide being fitted around said opening.

17 Claims, 2 Drawing Sheets

Fig.5
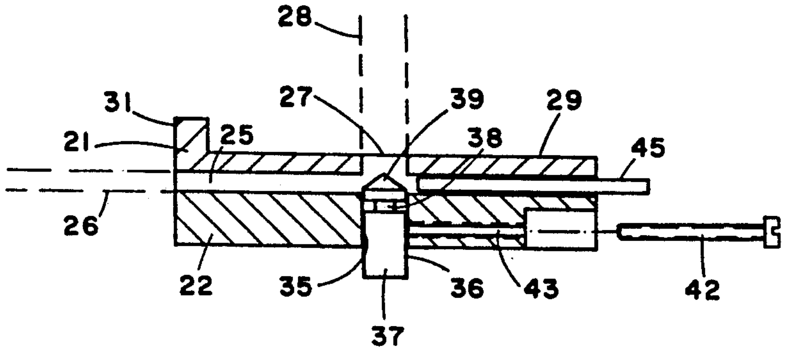
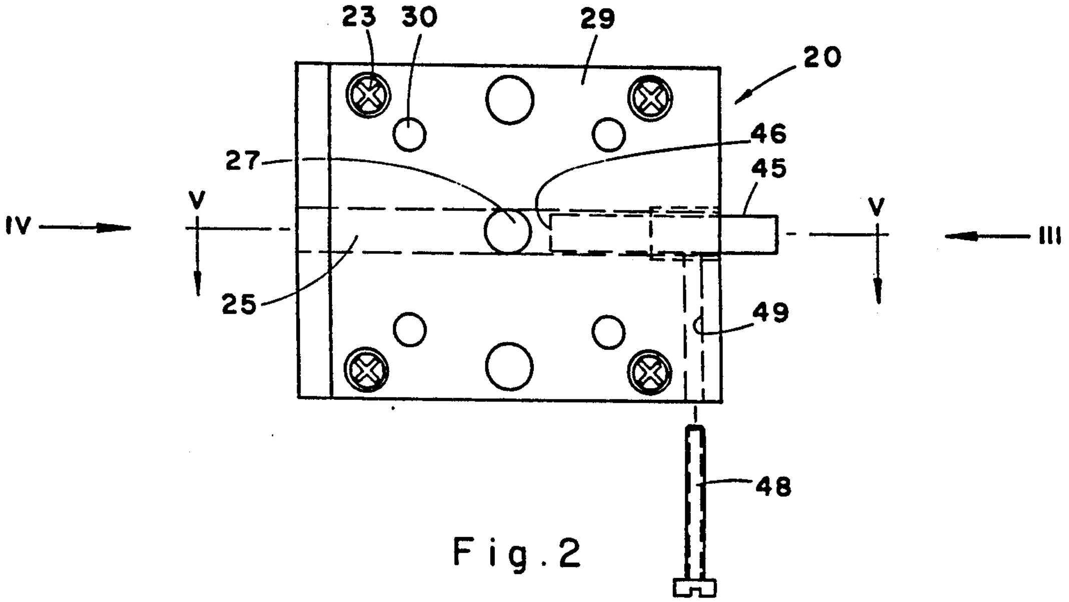
Fig.2
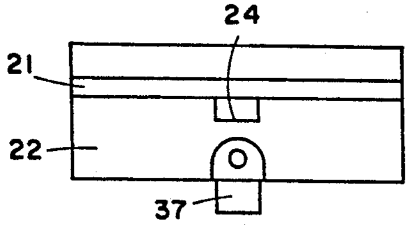
Fig.3
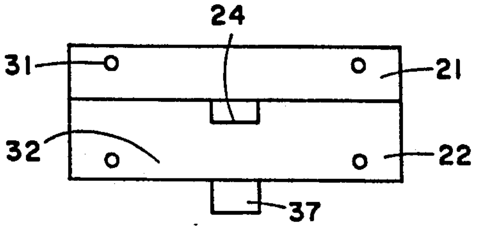
Fig.4

JUNCTION BETWEEN A RECTANGULAR AND A CIRCULAR WAVEGUIDE

FIELD OF INVENTION

The present invention is generally in the field of waveguides of microwave and millimeter wave radiation. The present invention provides a junction between a rectangular and a circular waveguide.

BACKGROUND OF THE INVENTION

Waveguides used in transmission of microwave radiation have either a rectangular or circular cross-section. In various systems it is at times necessary to provide a junction between those two kinds of waveguides.

One type of junction between a circular and a rectangular waveguide is of a kind in which the internal cross-section gradually changes from circular to rectangular. However, such junctions are generally relatively long (typical length of about 25-65 mm for typical millimeter wave frequency bands) and are thus unsuitable for various applications in which components have to be compacted in a small volume. Additionally, such junctions require that the rectangular and the circular waveguides be co-directional.

Another type of junction between a circular and a rectangular waveguide is of a kind in which the rectangular waveguide opens into the circular waveguide in a mid-point thereof in a manner that its broad side is parallel to the longitudinal axis of the circular waveguide. In such a junction only one polarity of a wave will be transmitted from the circular waveguide to the rectangular waveguide and thereby it is useful as a polarity selector. Additionally, an arrangement comprising two such junctions at right angles to one another may be used as a summator or separator of waves of different polarities.

To date, no junctions for coupling a circular waveguide to a rectangular waveguide, which are of a small size and which transmit the energy between the two waveguides at high efficiency, are available.

Waveguides can operate basically in two transmission modes: TE modes in which the electric field has only a transverse component and TM modes in which the magnetic field has only a transverse component. The present invention concerns only waveguides operating in the fundamental and some higher TE transmission modes.

It is the object of the present invention to provide a junction between a circular waveguide and a rectangular waveguide both operating in TE modes which is of a small size and which transmits the energy between the two waveguides at high efficiency.

The most common mode of operation of a rectangular waveguide is the $TE_{10}$ mode and the most common mode of operation of a circular waveguide is the $TE_{11}$ mode. The explanation of these two modes of operation is beyond the scope of this writing, but is no doubt clear to the artisan.

It is accordingly a particular object of the present invention to provide a junction between a rectangular waveguide operating in the $TE_{10}$ mode and a circular waveguide operating in the $TE_{11}$ mode.

It is a further object of the present invention to provide a coupling device between a circular and a rectangular waveguide comprising the above junction.

SUMMARY OF THE INVENTION

The present invention provides a junction between a rectangular waveguide and a circular waveguide both operating in TE transmission modes, the rectangular waveguide having broad sides A and narrow sides B, one of sides A having at its middle line a circular opening being of a diameter which is equal to or less than the diameter of the circular waveguide and the other of sides A being fitted with a tapered member, preferably essentially axisymmetric, inside the rectangular waveguide opposite said circular opening, an end of said circular waveguide being fitted around said opening.

For the purpose of coupling between a rectangular $TE_{10}$ transmission mode and a circular $TE_{11}$ transmission mode, the circular opening has to be at a distance from a short circuit reference plane in the rectangular waveguide equal to about a quarter of a wavelength of the central frequency in the desired operation range of the waveguides. The aforementioned short circuit reference plane may be the end wall of the waveguide or may be a virtual reference plane induced in the waveguide by a reflective member (usually conductive), at the end of said rectangular waveguide.

The circular opening's diameter depends to a large extent on the frequency of the electromagnetic waves and is determined by standard engineering considerations known per se.

The present invention further provides a device for coupling between a rectangular waveguide and a circular waveguide comprising the above junction.

BRIEF DESCRIPTION OF THE DRAWINGS

In the following, the invention will at times be described with reference to the annexed drawings.

In the drawings:

FIG. 2 shows a view from above of a coupling device in accordance with the invention;

FIGS. 3 and 4 are views from the direction of arrows III and IV in FIG. 2, respectively; and FIG. 5 is a cross section through line V—V in FIG. 2.

DETAILED DESCRIPTION OF THE INVENTION

Figure 1:
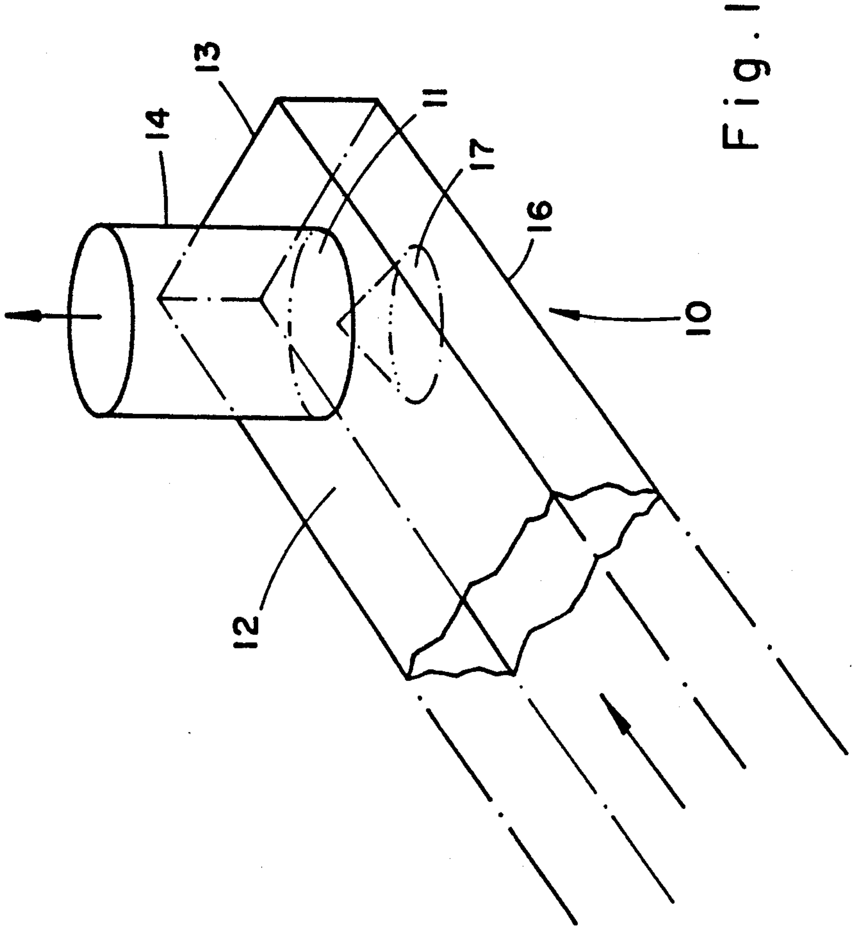
FIG. 1 is a schematic representation of a junction in accordance with the present invention.

In the following the invention will be illustrated with reference to some non-limiting embodiments shown in the annexed drawings. It will no doubt be appreciated by the artisan that various other embodiments may be envisaged all being within the scope of the invention or defined herein.

Attention is first directed to FIG. 1 which is a schematic representation of a junction in accordance with the present invention between a rectangular waveguide and a circular waveguide. A rectangular waveguide 10 having broad sides A and arrow sides B has a circular opening 11 in one of the A sides 12 close to end wall 13. The end of a circular waveguide 14 is fitted around opening 11.

In the inner face of the other of the A sides 16, opposite circular opening 11 is a tapered member 17 which in this particular embodiment has an axisymmetric conical shape. It should however be pointed out that the tapered member 17 may also have various other shapes, e.g. it may be of a double concave cross-sectional shape, a tapered dome shape and the like.

In order for the junction to transmit waves between a $TE_{10}$ mode of transmission in the rectangular waveguide and a $TE_{11}$ mode of transmission in the circular waveguide, the distance between the centre of circular opening 11 and end wall 13 should be equal to about a quarter wavelength of the central frequency in the operating range. However, in order to obtain optimal transmission between the two waveguides, the aforementioned distance should be fine-tuned experimentally. It should be pointed out that instead of being at a distance of about a quarter of the control frequency's wavelength ($\lambda/4$) from the end wall, the center of the circular opening may also be at a distance of about $\lambda/4$ from a virtual short circuit reference plane, e.g. one formed at a distance equaling that of a full wavelength from the end wall. Another important factor in order to obtain optimal transmission between the two waveguides is the elevation of the tapered member above side 16 which can also be experimentally fine-tuned in each case. It should be noted, however, that the artisan, on the basis of teaching of the present invention, will have no difficulty in fine-tuning such a junction to obtain optimal transmission.

Attention is now being directed to FIGS. 2-5 which show a coupling device for coupling between rectangular and circular waveguides comprising a junction in accordance with the present invention. Coupling device 20 consists of two members 21 and 22 which are joined together by means of screws 23. Member 22 has a rectangular recess 24 throughout its entire length so that by joining members 21 and 22 together a rectangular duct 25 is formed which then constitutes the terminal segment of a rectangular waveguide shown schematically in FIG. 5 by broken lines 26.

Member 21 has a circular bore 27 which forms the terminal segment of a circular waveguide shown schematically in FIG. 5 by broken lines 28.

Four screw holes 30 in the outer broad face 29 of member 21 and four screw holes 31 on side 32 of the coupling device serve for the attachment of a circular waveguide and of the rectangular waveguide members (not shown), respectively.

Member 22 of coupling device 20 also comprises a circular bore 35 in which there is fitted a metal plunger body 36 having a cylindrical base portion 37, a neck portion 38 and a head portion 39 having a conical top. The elevation of plunger body 36 can be changed and its position may be fixed by means of screw 42 which is fitted into threaded bore 43.

At the end of duct 25 which is opposite to face 32 there is fitted a rectangular shorting plunger 45, its face 46 constituting the end wall of the rectangular waveguide, which is movable along the axis of said duct and which may be fixed in position by means of screw 48 which fits into threaded bore 49.

In order to obtain optimal transmission of waves between the two waveguides, i.e. between rectangular waveguide 26 to circular waveguide 28 and vice versa, both the elevation of plunger body 36 and the exact position of shorting plunger 45 can be pre-set to a given measure or fine-tuned experimentally, a feat which may easily be performed by the artisan.

I claim:

1. A junction for coupling between a TE transmission mode in the rectangular waveguide and a TE transmission mode in the circular waveguide, the rectangular waveguide having broad sides A and narrow sides B, one of sides A having at its middle line a circular opening being of a diameter which is equal to or less than the diameter of the circular waveguide and the other of sides A having a tapered member protruding from its inside surface opposite said circular opening, an end of said circular waveguide abutting the rectangular waveguide over said opening.

2. A junction according to claim 1 adapted for coupling between a $TE_{10}$ transmission mode in the rectangular waveguide and $TE_{11}$ transmission mode in the circular waveguide, wherein the center of the circular opening is at a distance from a short circuit reference plane in the rectangular waveguide which is equal to about a quarter of the wavelength of the central frequency in the desired operating range of the junction.

3. A junction according to claim 2, wherein the center of the circular opening is at a distance from an end wall of the rectangular waveguide which is equal to about a quarter of the wavelength of the central frequency in the desired operating range of the junction.

4. A junction according to claim 3 wherein said end wall is a movable plunger.

5. A junction according to claim 1, wherein said tapered member is essentially axisymmetrical.

6. A junction according to claim 5, wherein said tapered member is integral with said other of sides A.

7. A junction according to claim 5, wherein said tapered member protrudes through an opening in and is nonintegral with said other of sides A.

8. A coupling device for coupling between a TE transmission mode in a rectangular waveguide and a TE transmission mode in a circular waveguide, comprising an end portion of a rectangular waveguide having broad sides A, narrow sides B, and an end wall, one of sides A having at its middle line a circular opening being of a diameter which is equal to or less than the diameter of the circular waveguide and further comprising a tapered member protruding from the inside surface of the other of sides A opposite said circular opening, said circular opening leading into the circular waveguide.

9. A device according to claim 8, comprising means for changing the height which the tapered member protrudes from the inside surface of said other of sides A.

10. A device according to claim 8, comprising means to change the distance between the end wall and the center of the circular opening.

11. A device according to claim 10, wherein said tapered member is essentially axisymmetrical.

12. A device for coupling between a TE transmission mode in a rectangular waveguide and a TE transmission mode in a circular waveguide comprising:

- a first member having a first circular bore;
- a second member having a second bore and joined with said first member so as to form a substantially rectangular duct therebetween having broad sides A and narrow sides B, with the opening of said first circular hole positioned above the midline of one of said broad sides A, and said second bore positioned in the other of said broad sides A opposite said first circular bore;
- a plunger disposed to slide in the rectangular duct;
- means for attaching a circular waveguide to said first member so that said first circular bore opens into the circular waveguide; and
- a tapered member protruding through said second bore into said rectangular duct for coupling a TE transmission mode in the rectangular duct with a TE transmission mode in a circular waveguide attached to said first member.

13. A device according to claim 12, further comprising means for adjusting the height which said tapered member protrudes into the rectangular duct.

14. A device according to claim 13, further comprising means for attaching a rectangular waveguide to said first member and said second member so that the rectangular duct opens into the rectangular waveguide.

15. A device according to claim 14, further comprising means for securing the position of said plunger.

16. A device according to claim 15, further comprising means for securing the position of said tapered member.

17. A device according to claim 13, wherein said tapered member is essentially axisymmetrical.

* * * * *